(12) United States Patent
Jang et al.

(10) Patent No.: US 8,446,428 B2
(45) Date of Patent: May 21, 2013

(54) IMAGE PROCESSING APPARATUS AND METHOD OF CONTROLLING THE SAME

(75) Inventors: Jong-hyuk Jang, Gunpo-si (KR); Seung-kwon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 12/753,325

(22) Filed: Apr. 2, 2010

(65) Prior Publication Data

US 2011/0063321 A1 Mar. 17, 2011

(30) Foreign Application Priority Data

Sep. 14, 2009 (KR) ........................ 10-2009-0086570

(51) Int. Cl.
| | |
|---|---|
| *G06F 3/033* | (2006.01) |
| *G06F 17/00* | (2006.01) |
| *G06F 3/00* | (2006.01) |
| *G06F 3/048* | (2006.01) |
| *G09G 5/00* | (2006.01) |
| *G06K 9/03* | (2006.01) |
| *G06K 9/22* | (2006.01) |
| *G06K 9/00* | (2006.01) |
| *H04N 5/225* | (2006.01) |
| *H04N 5/50* | (2006.01) |
| *H04N 1/04* | (2006.01) |

(52) U.S. Cl.
USPC ........... 345/619; 345/418; 345/157; 345/179; 348/169; 348/569; 358/478; 382/311; 382/313; 382/318; 715/700; 715/764; 715/857; 715/859; 725/38; 725/60

(58) Field of Classification Search ................. 345/418, 345/581, 594, 619–620, 637, 156–157, 520, 345/207; 348/14.03, 14.05, 169, 563, 569–570, 348/601; 382/311–313, 314, 318–319; 715/200, 715/700–702, 716, 723, 727–728, 754, 764, 715/831, 862; 358/537, 424, 448, 452, 478; 725/37–38, 60–61
See application file for complete search history.

(56) References Cited

U.S. PATENT DOCUMENTS

| | | | |
|---|---|---|---|
| 5,515,079 A | 5/1996 | Hauck | |
| 6,512,507 B1 * | 1/2003 | Furihata et al. | ................ 345/157 |

(Continued)

FOREIGN PATENT DOCUMENTS

| | | |
|---|---|---|
| EP | 1087327 A2 | 3/2001 |
| JP | 2000-56925 A | 2/2000 |

(Continued)

OTHER PUBLICATIONS

Extended European Search Report issued in Application No. 10161316.4; dated Feb. 7, 2011.

*Primary Examiner* — Wesner Sajous
(74) *Attorney, Agent, or Firm* — Sughrue Mion, PLLC

(57) ABSTRACT

An image processing apparatus includes: an image processing unit which processes and displays an image; a recognizing unit which recognizes a pointing operation input from a pointing device; and a control unit which executes during an execution a predetermined function when a first pointing operation which selects the predetermined function and a second pointing operation which confirms whether to execute the selected predetermined function are input from the pointing device, and controls the image processing unit to process the image in response to the execution of the predetermined function. With this configuration, it is possible to more precisely detect a pointing operation input from a pointing device according to user's intention and allow a user to serve the user's intention using the pointing device.

18 Claims, 13 Drawing Sheets

U.S. PATENT DOCUMENTS

| | | | |
|---|---|---|---|
| 2001/0044858 A1* | 11/2001 | Rekimoto | 710/1 |
| 2002/0186351 A1 | 12/2002 | Gnanamgari et al. | |
| 2003/0128188 A1* | 7/2003 | Wilbrink et al. | 345/158 |
| 2007/0050719 A1* | 3/2007 | Lui et al. | 715/762 |
| 2010/0253624 A1* | 10/2010 | Wilson | 345/158 |

FOREIGN PATENT DOCUMENTS

| | | |
|---|---|---|
| KR | 10-2001-0026856 A | 4/2001 |
| KR | 10-2007-0120922 A | 12/2007 |
| WO | 01/052230 A1 | 7/2001 |

\* cited by examiner

IMAGE PROCESSING APPARATUS AND METHOD OF CONTROLLING THE SAME

CROSS-REFERENCE TO RELATED APPLICATIONS

This application claims priority from Korean Patent Application No. 10-2009-0086570, filed on Sep. 14, 2009 in the Korean Intellectual Property Office, the disclosure of which is incorporated herein by reference in its entirety.

BACKGROUND

1. Field

Methods and devices consistent with the exemplary embodiments relate to an image processing apparatus and a method of controlling the same, and more particularly, to an image processing apparatus which is capable of more precisely detecting a pointing operation input from a pointing device according to a user's intention by quickly informing the user that a particular function is selected and executing the function when an acknowledgement to the selection is input from the user, and a method of controlling the same.

2. Description of the Related Art

An image processing apparatus recognizes a pointing device based on pointing operation input from the pointing device.

FIG. 1 is a schematic view used to explain a method of controlling an image processing apparatus using a pointing device.

A user may select a particular function using pointing devices 110 and 120. Specifically, the user may point to a menu for the particular function displayed on a screen 101 through the pointing operation. For example, as shown in FIG. 1, the user may point to a menu item TOOL 4 106 with a first pointing device 110 and point to a menu item NEXT SLIDE 108 with a second pointing device 120.

The image processing apparatus recognizes the pointing devices at a point of time when the pointing devices are scanned. That is, the scanning of the pointing devices coincides with the recognition of the pointing devices. Accordingly, the image processing apparatus may also recognize all of a series of pointing operations which occur against user's intention. In this case, contrary to the user's intention, a particular function may be incorrectly recognized in a screen even with a series of pointing operations, which may result in a malfunction of the apparatus.

SUMMARY

Accordingly, it is an aspect of the exemplary embodiments to provide an image processing apparatus which is capable of more precisely detecting a pointing operation input from a pointing device according to a user's intention by preventing an unintended function from being performed due to misrecognition of a particular function, and a method of controlling the same.

Additional aspects of the exemplary embodiments will be set forth in part in the description which follows and, in part, will be obvious from the description, or may be learned by practice of the exemplary embodiments.

The foregoing and/or other aspects of the exemplary embodiments can be achieved by providing an image processing apparatus including: an image processing unit which processes and displays an image; a recognizing unit which recognizes a pointing operation input from a pointing device; and a control unit which executes a predetermined function when a first pointing operation which selects the predetermined function and a second pointing operation which confirms whether to execute the selected predetermined function are input from the pointing device, and controls the image processing unit to process the image in response to the execution of the predetermined function.

In the image processing apparatus, the second pointing operation may include at least one of a particular operation which occurs for a predetermined period of time, a particular operation which is repeated a predetermined number of times, a particular pattern of an operation, an operation which indicates any region on a screen, and an operation which indicates a specified region on a screen. In the image processing apparatus, the control unit may control the image processing unit to display a first indicator to indicate whether the predetermined period of time elapses. In the image processing apparatus, the control unit may control the image processing unit to change at least one of definition, transparency, size, color and contents of the first indicator with time. In the image processing apparatus, if the particular operation stops before the predetermined period of time elapses or before the predetermined number of times is reached, the control unit may restart a determination operation of whether the predetermined period of time elapses or the predetermined number of times is reached from the point of time when one of the particular operations is again input. In the image processing apparatus, when the first pointing operation is input, the control unit may hold the predetermined function in a standby state to prepare for execution of the predetermined function until the second pointing operation is input. In the image processing apparatus, the control unit may control the image processing unit to display a second indicator to inquire whether to input the second pointing operation. In the image processing apparatus, the pointing device may include at least one of a laser pointer and a light pen. The image processing apparatus may further include an audio processing unit which processes and outputs audio, and the control unit may control the audio processing unit to output sound to indicate whether the predetermined period of time elapses. In the image processing apparatus, the control unit may control the audio processing unit to change at least one of output volume, output interval, and output type of the sound over time.

The foregoing and/or other aspects of the exemplary embodiments can be achieved by providing a method of controlling an image processing apparatus, including: recognizing a pointing operation input from a pointing device; receiving a first pointing operation to select a predetermined function; receiving a second pointing operation to confirm whether to execute the selected predetermined function; executing the predetermined function; and processing and displaying an image in response to the execution of the predetermined function.

In the method, the second pointing operation may include at least one of a particular operation which occurs for a predetermined period of time, a particular operation which is repeated by a predetermined number of times, a particular pattern of operation, an operation which indicates any region on a screen, and an operation which indicates a specified region on a screen. The method may further include displaying a first indicator to indicate whether the predetermined period of time elapses. The method may further include changing at least one of definition, transparency, size, color and contents of the first indicator with time. The method may further include: if the particular operation stops before the predetermined period of time elapses or before the predetermined number of times is reached, restarting a determination as to whether the predetermined period of time elapses or the predetermined number of times is reached from a point of time when one of the particular operations is again input. The method may further include: when the first pointing operation is input, holding the predetermined function in a standby state to prepare for execution of the predetermined function until the second pointing operation is input. The method may further include displaying a second indicator to inquire whether to input the second pointing operation. In the method, the pointing device may include at least one of a laser pointer and a light pen. The method may further include outputting a sound to indicate whether the predetermined period of time elapses. The method may further include changing at least one of output volume, output interval, and output type of the sound with time.

As described above, according to an aspect of the exemplary embodiments, it is possible to more precisely detect a pointing operation input from a pointing device to user's intention and allow a user to serve the user's intention using the pointing device by preventing an unintended function from being performed due to misrecognition of a particular function.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
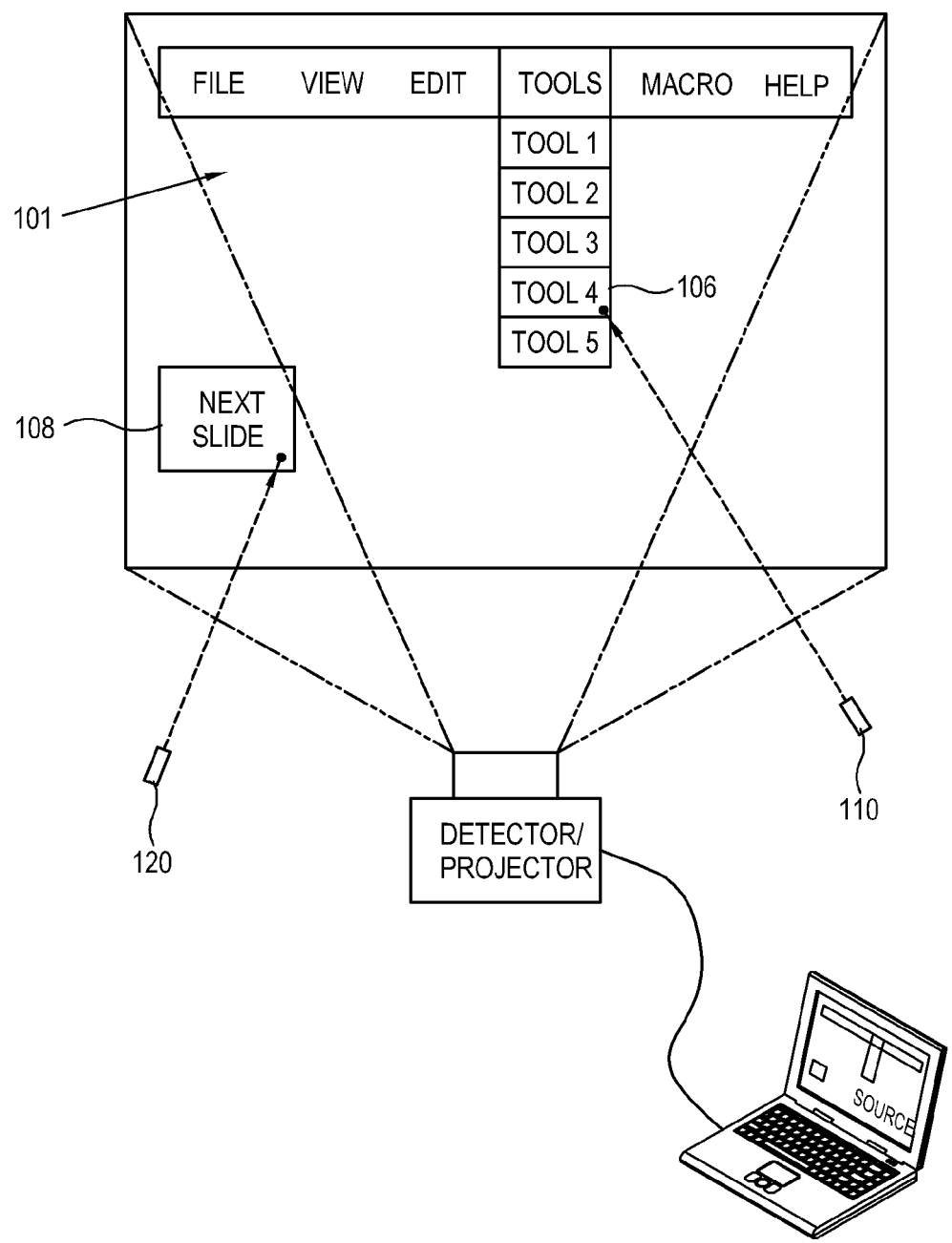
FIG. 1 is a schematic view for explaining a method of controlling an image processing apparatus of the related art using a pointing device.

Reference will now be made in detail to the exemplary embodiments, which are illustrated in the accompanying drawings, so that those in the art can easily practice them. The exemplary embodiments are not limited to the exemplary embodiments disclosed herein but may be implemented in different forms. In the following exemplary embodiments, for the purpose of clarity, the like components are denoted by the like reference numerals throughout the drawings, and repetitive descriptions will be avoided as necessary. Expressions such as "at least one of" when preceding a list of elements, modifies the entire list of elements and does not modify the individual elements of the list.

Figure 2:
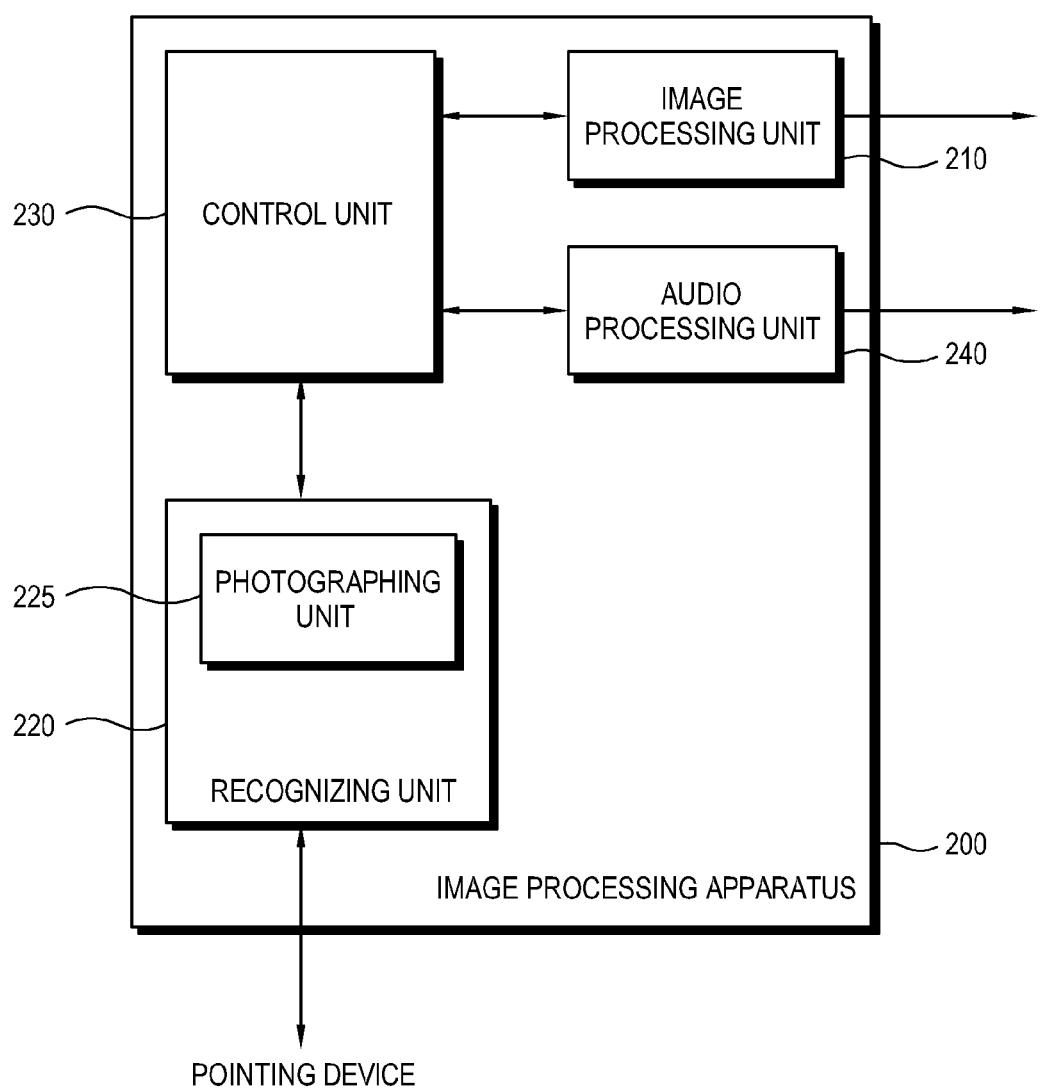
FIG. 2 is a view showing a configuration of an image processing apparatus according to an exemplary embodiment.

FIG. 2 is a view showing a configuration of an image processing apparatus according to an exemplary embodiment.

An image processing apparatus 200 according to an exemplary embodiment may be a projector, a television (TV), a large format display (LFD), a personal computer (PC), a mobile terminal or any of other electronic devices as long as it can recognize a pointing device based on a pointing operation input from a pointing device and can be controlled by the pointing operation.

As shown in FIG. 2, the image processing apparatus 200 according to this exemplary embodiment may include an image processing unit 210, a recognizing unit 220, a control unit 230 and an audio processing unit 240.

The image processing unit 210 may process and display an image. Specifically, the image processing unit 210 may display a first indicator and a second indicator which will be described later. In this case, the image processing unit 210 may change at least one of definition, transparency, size, color and contents of the first indicator with time.

In addition, the image processing unit 210 may include a liquid crystal display (LCD), an organic light emitting display (OLED), a plasma display panel (PDP) or the like.

The recognizing unit 220 may recognize pointing operation input from the pointing device. The pointing operation may include all types of operations which can be performed by the pointing device. The pointing device may include at least one of a laser pointer, a light pen and a mouse.

This exemplary embodiment may be implemented in a manner that it depends on the image processing apparatus and not on the pointing device. In other words, for example, this exemplary embodiment does not need to add a button for performing a function of confirming a user's intention to a pointing device, such as a laser pointer, or provide any new pointing device for performing such a function. For example, in the related art, a button used to perform a new function, a different kind of signal is transmitted to distinguish it from any existing pointing operation. Or, as another example, a new pointing device, such as a mouse, may be used in the related art to perform a new function, but in this case, a user has to use the mouse instead of the existing pointing device. Accordingly, the compatibility of the pointing device cannot be secured.

In this exemplary embodiment, the image processing apparatus discriminately recognizes pointing operations input from the existing point devices. For example, the image processing apparatus recognizes the pointing operations with them classified into a first pointing operation and a second pointing operation. Accordingly, it is possible to implement the exemplary embodiment with any pointing device, and thus, secure the compatibility of the pointing devices.

If the image processing apparatus 200 according to this exemplary embodiment is implemented by a projector, the recognizing unit 220 may further include a photographing unit 225. The photographing unit 225 photographs a projection image displayed on a screen and the image processing apparatus 200 determines position information of indicators originating from the pointing devices based on the photographed projection image.

Upon receiving the first pointing operation for selecting a predetermined function and the second pointing operation for confirming whether to execute the predetermined function from the pointing devices, the control unit 230 executes the predetermined function. In this case, the control unit 230 controls the image processing unit 210 to process the image according to the executed predetermined function.

Upon receiving the first pointing operation, the control unit 230 may maintain a standby state for preparing execution of the predetermined function until the second pointing operation is input to the control unit 230. That is, the predetermined function may be held in a standby state until the execution of the predetermined function is confirmed through inputting the second pointing operation.

The second pointing operation may be at least one of a particular operation which occurs for a predetermined period of time, a particular operation repeated by a predetermined number of times, a particular pattern of operation, an operation indicating any region on a screen and an operation indicating a specified region on a screen.

The particular operation which occurs for the predetermined period of time refers to an operation for inputting a defined form of operation for a predefined period of time. For example, this operation may be an operation which indicates any point, for example a point on a screen, for 3 seconds with a laser pointer.

The particular operation repeated by the predetermined number of times refers to an operation for repeatedly inputting a defined form of operation by a predefined number of times. For example, this operation may be an operation that repeats turning on/off of a laser pointer three times.

The particular pattern of operation refers to an operation drawing a predefined form of pattern. For example, this operation may be an operation that scans a pattern such as a circle, a square, a curve or the like. In this case, the control unit 230 may track motion of a laser pointer indicated on a screen and match it to a predefined pattern.

The operation indicating any region on a screen refers to an operation that contacts a pointing device to one region on the screen. For example, this operation may be an operation that points to a screen with a laser pointer.

The operation indicating a specified region on a screen refers to an operation that contacts a pointing device to a predefined region. For example, this operation may be an operation that scans a particular menu item displayed on a screen with a laser pointer.

If a particular operation stops before a predetermined period of time elapses or before a predetermined number of times is reached, the control unit 230 may restart the determination of whether or not the predetermined period of time elapses or the predetermined number of times is reached from a point of time when the particular operation is again input.

According to one exemplary embodiment, if the second pointing operation is a particular operation occurring for a predetermined period of time, the control unit 230 may control the image processing unit 210 to display a first indicator indicating whether or not the predetermined period of time elapses. In this case, the control unit 230 may control the image processing unit 210 to change at least one of definition, transparency, size, color and contents of the first indicator with time.

According to another exemplary embodiment, the control unit 230 may control the image processing unit 210 to display a second indicator inquiring whether to input the second pointing operation. In this case, if the pointing device points to a region in which the second indicator is displayed or a trace of the pointing device moves in a direction pointed to by the second indicator, the control unit 230 may determine whether the second pointing operation is input or not depending on the contents of the second indicator. More specifically, if the second indictor is a YES indicator, the control unit 230 may determine that the second pointing operation is input, but if the second indicator is a NO indicator, the control unit 230 may determine that the second pointing operation is not input.

According to still another exemplary embodiment, if the second pointing operation is a particular operation which occurs for a predetermined period of time, the control unit 230 may control the audio processing unit 240 to output a sound indicating whether or not the predetermined period of time elapses. In this case, the control unit 230 may control the audio processing unit 240 to change at least one of output volume, output interval, and output type of the sound with time. To this end, the image processing apparatus 200 may further include the audio processing unit 240 which processes and outputs audio.

Figure 3A:
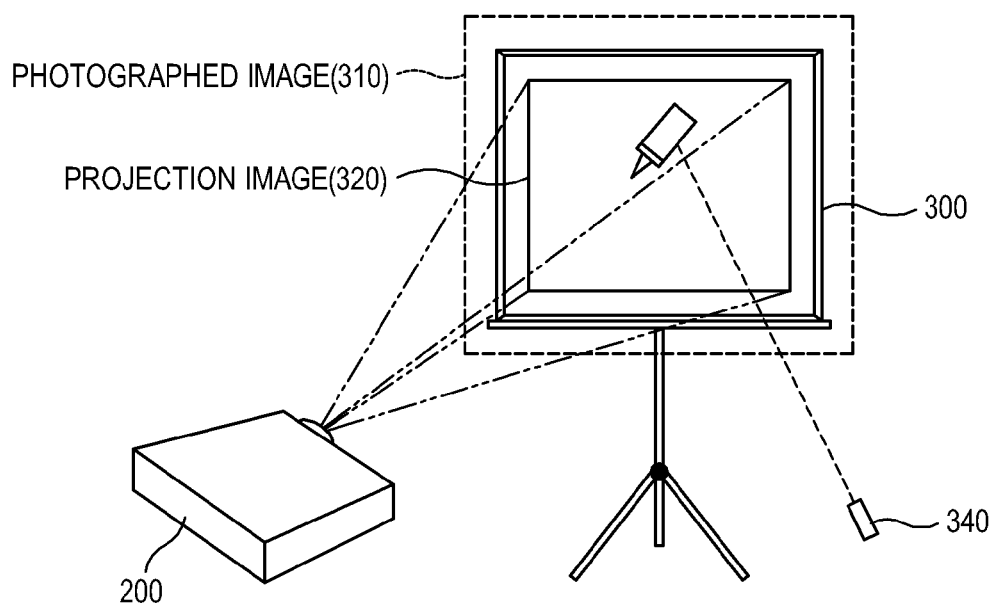
FIGS. 3A and 3B are views showing a method of recognizing a pointing device depending on a form of image processing apparatus according to an exemplary embodiment.
Figure 3B:
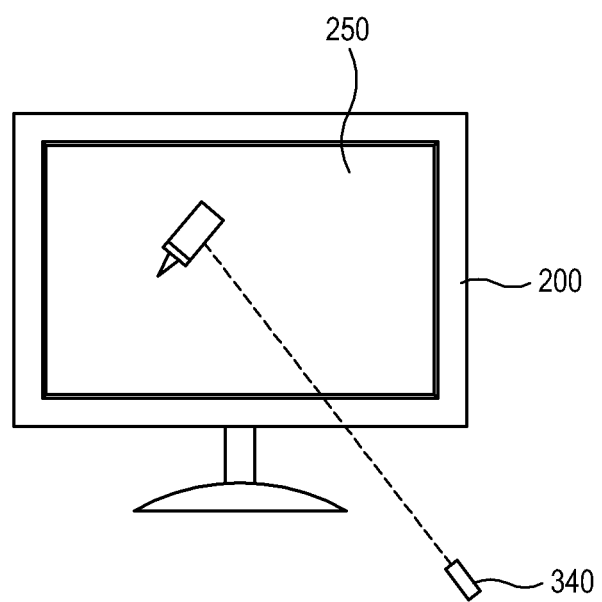

FIGS. 3A and 3B are views showing a method of recognizing a pointing device depending on a form of image processing apparatus according to an exemplary embodiment.

FIG. 3A shows a case where the image processing apparatus 200 displays a processed image on a display unit 300 located separately out of the image processing apparatus 200. For example, this case may be a case where a projector projects a processed image on a screen or a case where an image processed by a PC is output to a monitor. In this case, the image processing apparatus 200 may photograph a projection image 320 projected on the display unit 300 and use an obtained photographed image 310 to calculate pointing position of a pointing device 340.

FIG. 3B shows a case where the image processing apparatus 200 displays a processed image on a display unit 250 integrated with the image processing apparatus 200. For example, this case may be a case where an image processed in a digital TV, an LFD or the like is displayed on a display panel. In this case, the image processing apparatus 200 may determine pointing position of the pointing device 340 using any of various methods including a method of receiving light, a method of measuring a change in current, a decompressing method of measuring a change in pressure and the like.

FIGS. 4A to 4D are views showing a method of controlling an image processing apparatus according to an exemplary embodiment.

According to the method of controlling the image processing apparatus 200 according to an exemplary embodiment, if the second pointing operation is a particular operation which occurs for a predetermined period of time, the image processing apparatus 200 may display the first indicator in a manner which indicates whether or not the predetermined period of time elapses. In this case, the image processing apparatus 200 may change at least one of definition, transparency, size, color and contents of the first indicator with time.

The first indicator may be displayed in various forms. For example, the first indicator may be in the form of any shape including an icon, an arrow, a figure or the like.

The first indicator begins to be displayed from a point of time when the second pointing operation used to confirm whether or not a predetermined function is performed is input. In this case, the first indicator may be displayed at a pointing spot or may point to a pointing spot. For example, if the first indicator is of an icon shape, it may be displayed at a pointing spot, or if the first indicator is of an arrow shape, it may point to a pointing spot in an arrow direction.

Figure 4A:
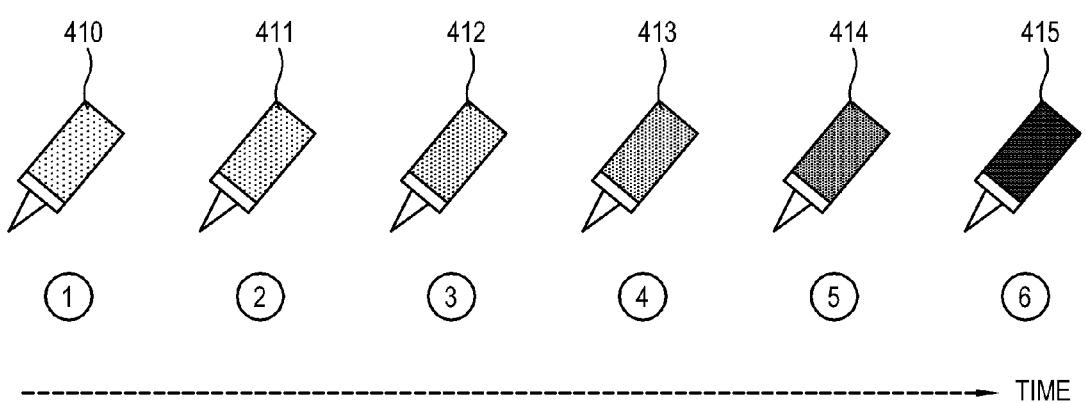
FIGS. 4A to 4D are views showing a method of controlling an image processing apparatus according to an exemplary embodiment.

FIG. 4A shows a change in definition of the first indicator over time. Referring to FIG. 4A, the first indicator is displayed as a pencil-shaped icon and becomes more definite over time. For example, a first indicator 410 appearing at the point of time ① when the second pointing operation is input becomes more definite over time in an order of a first indicator 411 at the point of time ②, a first indicator 412 at the point of time ③, a first indicator 413 at the point of time ④, a first indicator 414 at the point of time ⑤ and a first indicator 415 at the point of time ⑥. When the first indicator 415 at the point of time ⑥ is displayed, the image processing apparatus 200 performs a selected predetermined function. Thus, as the second pointing operation occurs and approaches the predetermined period of time, the first indicator becomes more definite over time to indicate the progress of inputting the second pointing operation.

In addition, if a particular operation stops before a predetermined period of time elapses or before a predetermined number of times is reached, the image processing apparatus 200 may restart the determination of whether or not the predetermined period of time elapses or the predetermined number of times is reached from the point of time when the particular operation is again input. If a user who is inputting a particular operation inputs a different operation at the point of time ③, for example, the image processing apparatus 200 returns to the point of time ① to newly determine whether or not the predetermined period of time elapses. In this case, the image processing apparatus 200 again displays the first indicator 410 at the point of time ① and changes the first indicator 410 in an order of 411→412→413→414→415 with time. This allows the user to easily determine whether or not the image processing apparatus 200 is in the condition where a selected predetermined function is executable.

For example, if a drawing function is selected and the second pointing operation is an operation pointing to any point for more than 3 seconds, the user may operate a laser pointer as follows. If the user wishes to execute a selected function, the user continues to scan a screen without the laser pointer turned off. If the user does not wish to execute the selected function, the user may turn off the laser pointer or scan another point with the laser pointer. When the user scans any point with the laser pointer for more than 3 seconds, the drawing function is executed after 3 seconds. When the screen is scanned with the laser pointer, an icon is changed with time for screen scanning, thereby allowing the user to know when the function is executed. In addition, the user may execute a desired instruction at a desired spot by moving an icon to a spot at which the user wishes to execute a corresponding function and fixing the icon thereat.

Figure 4B:
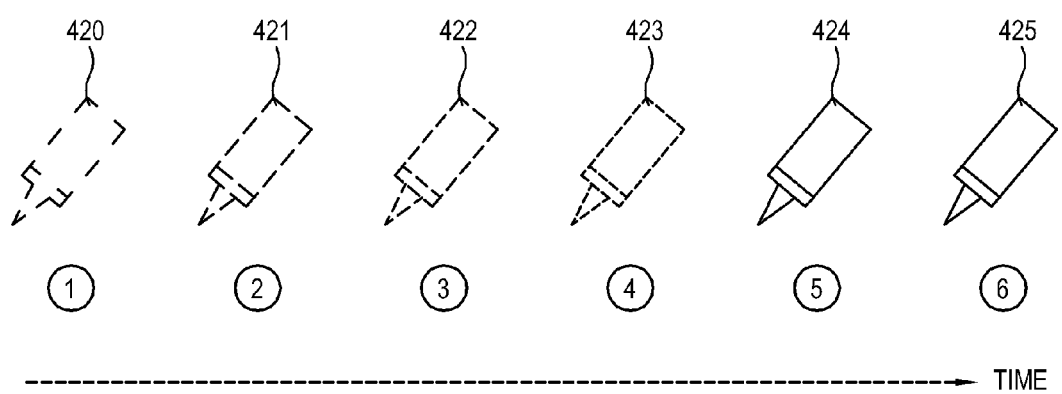

FIG. 4B shows change in transparency of the first indictor over time. Referring to FIG. 4B, the first indicator becomes shaped with time and has a complete shape when the point of time ⑥ is reached. For example, a first indicator 420 appearing at the point of time ① when the second pointing operation is input becomes shaped over time in an order of a first indicator 421 at the point of time ②, a first indicator 422 at the point of time ③, a first indicator 423 at the point of time ④, a first indicator 424 at the point of time ⑤ and a first indicator 425 at the point of time ⑥. Thus, the first indicator becomes less transparent over time.

Figure 4C:
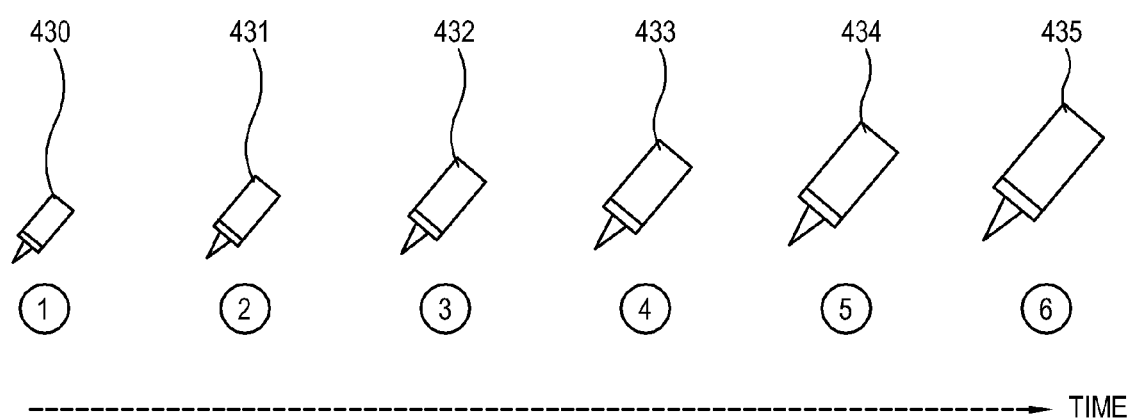

FIG. 4C shows change in size of the first indictor over time. Referring to FIG. 4C, the first indicator becomes larger with time and has a size unchanged when the point of time ⑥ is reached. For example, a first indicator 430 appearing at the point of time ① when the second pointing operation is input becomes larger over time in an order of a first indicator 431 at the point of time ②, a first indicator 432 at the point of time ③, a first indicator 433 at the point of time ④, a first indicator 434 at the point of time ⑤ and a first indicator 435 at the point of time ⑥.

Figure 4D:
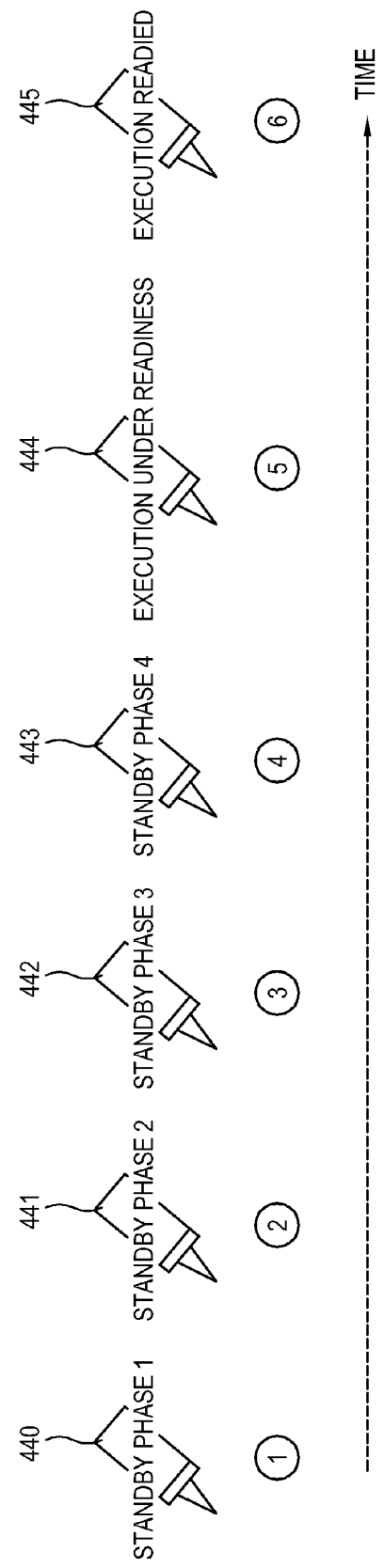

FIG. 4D shows change in contents of the first indictor over time. For example, the first indicator may indicate a time-varying state with a character. A first indicator 440 at the point of time ⑥ when the second pointing operation is input indicates contents, "standby phase 1." A first indicator 441 at the point of time ② indicates contents, "standby phase 2," a first indicator 442 at the point of time ③ indicates contents, "standby phase 3," and a first indicator 443 at the point of time ④ indicates contents, "standby phase 4." In addition, a first indicator 444 at the point of time ⑤ indicates contents, "execution under readiness," and a first indicator 445 at the point of time ⑥ indicates contents, "execution readied."

According to a modification, the image processing apparatus 200 may display a first indicator indicating a standby state. In this case, the image processing apparatus 200 may change at least one of definition, transparency, size, color and contents of the first indicator with time.

The first indicator begins to be displayed from the point of time when the first pointing operation to select a predetermined function is input. When the first pointing operation is input, a standby state to prepare for execution of the selected predetermined function is held until the second pointing operation to confirm whether to execute the predetermined function is input. In this case, the first indicator indicating the standby state is displayed and the first indicator displayed during the standby state may be changed over time.

Assuming that the first indicator is changed during the standby state, as shown in FIG. 4A, the first indicator 410 appearing at the point of time ① when the first pointing operation is input becomes more definite over time in an order of the first indicator 411 at the point of time ②, the first indicator 412 at the point of time ③, the first indicator 413 at the point of time ④, the first indicator 414 at the point of time ⑤ and the first indicator 415 at the point of time ⑥. When the first indicator 415 at the point of time ⑥ is displayed, the image processing apparatus 200 is in a state where the selected predetermined function is executable. When the user inputs the second pointing operation, with the first indicator 415 at the point of time ⑥ displayed, the image processing apparatus 200 performs the predetermined function.

Although FIGS. 4A to 4D show change in one of the factors which form the first indicator, however, two or more factors may be changed over time.

The image processing apparatuses of the related art have conventionally recognized a pointing device at the point of time when the point device inputs a pointing operation. Therefore, the image processing apparatuses of the related art could not separate a pointing time from a recognizing time and, in some cases, misrecognized functions which were not intended by a user by a series of operation of pointing devices.

According to an exemplary embodiment, the image processing apparatus performs a predetermined function only if the first pointing operation to select a predetermined function and the second pointing operation to confirm whether to execute the selected predetermined function are input from a pointing device. That is, the procedure to confirm whether to execute the selected function is taken once more, thereby allowing the image processing apparatus to perform only an operation intended by a user.

Figure 5A:
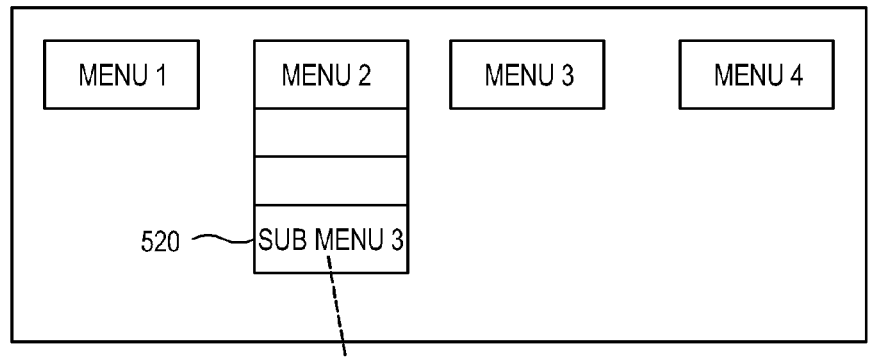
FIGS. 5A to 5C are views showing a method of controlling an image processing apparatus according to another exemplary embodiment.
Figure 5A:
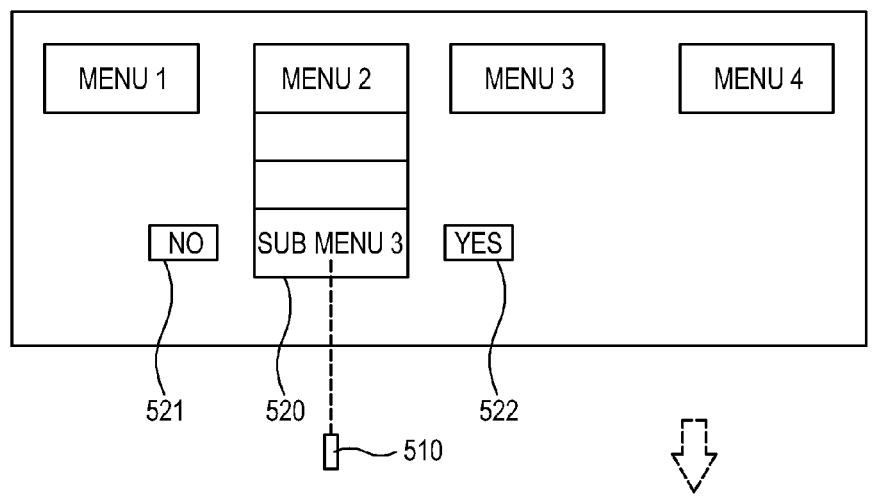
Figure 5A:
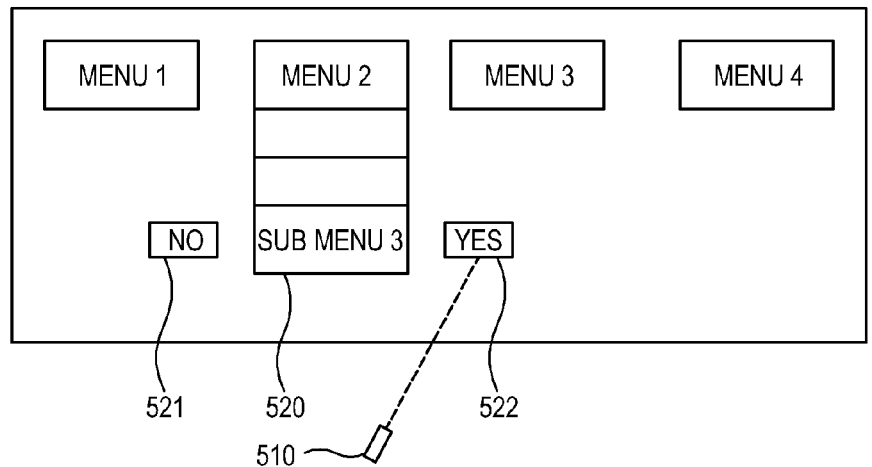
Figure 5B:
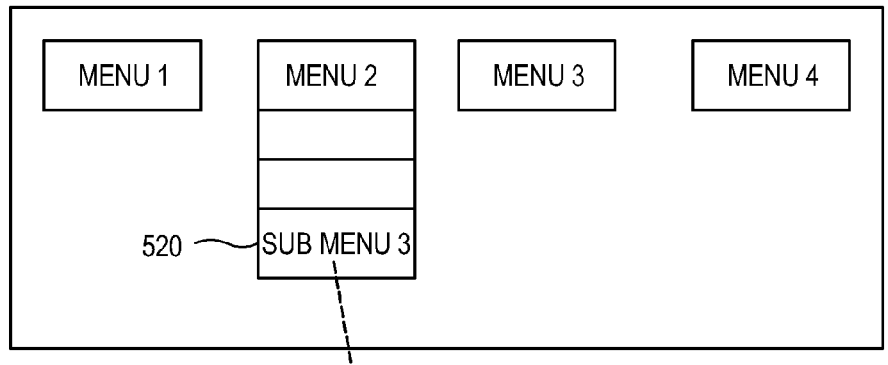
Figure 5B:
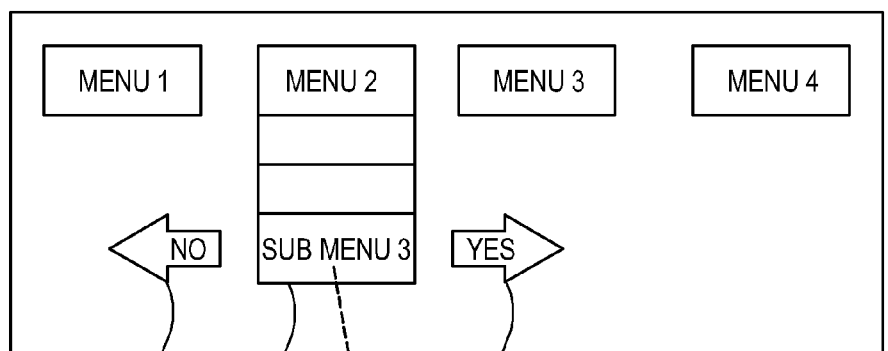
Figure 5B:
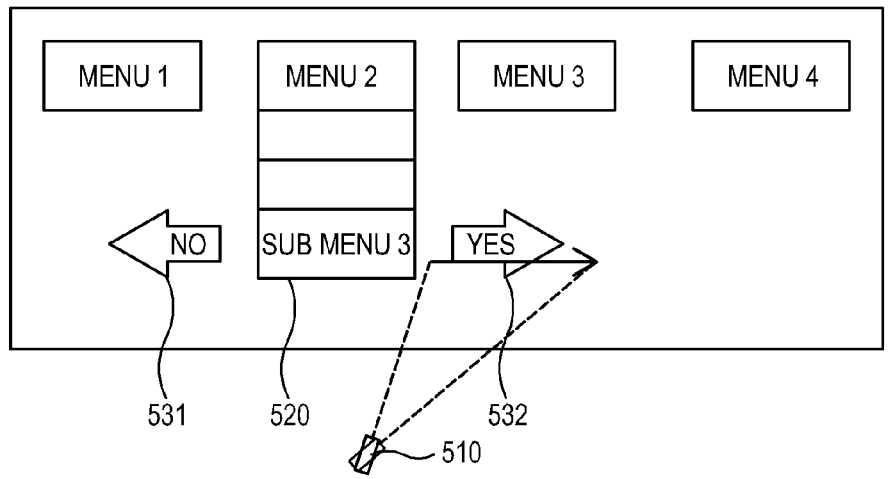
Figure 5C:
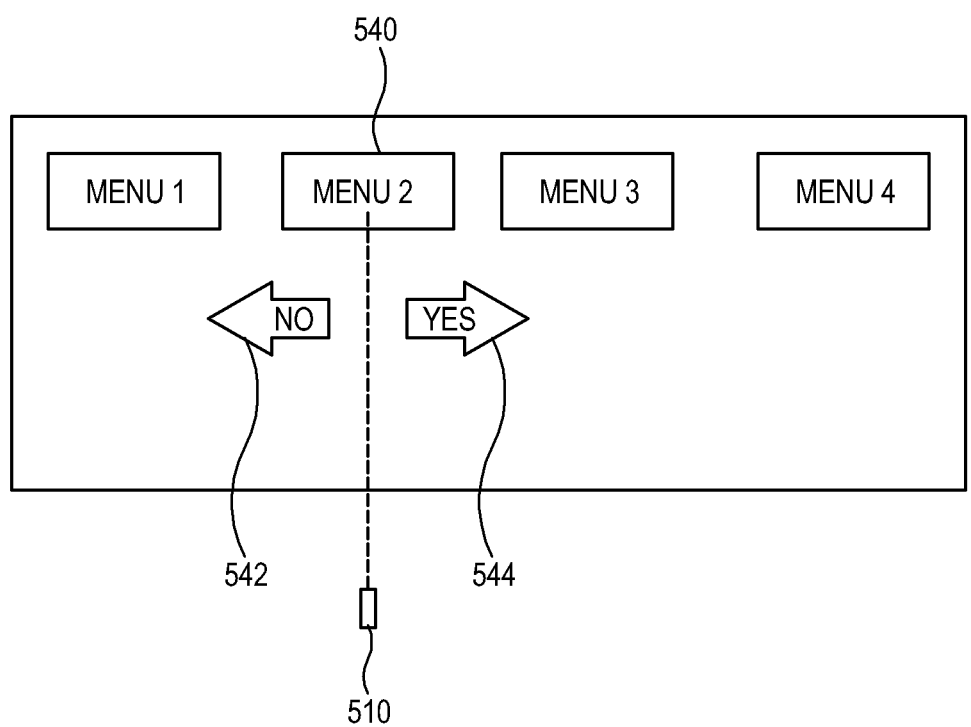

FIGS. 5A to 5C are views showing a method of controlling an image processing apparatus according to another exemplary embodiment.

According to the method of controlling the image processing apparatus 200 according to another exemplary embodiment, the image processing apparatus 200 may display the second indicator to inquire whether to input the second pointing operation. In this case, if a pointing device points to a region in which the second indicator is displayed or a trace of the pointing device is moved in a direction indicated by the second indicator, the image processing apparatus 200 may determine whether the second pointing operation is input or not depending on the contents of the second indicator. For example, if the second indictor is a "YES" indicator, the image processing apparatus 200 may determine that the second pointing operation is input, but if the second indicator is a "NO" indicator, the image processing apparatus 200 may determine that the second pointing operation is not input.

As shown in FIG. 5A, if the pointing device scans the region in which the second indicator is displayed, the image processing apparatus 200 determines whether the second pointing operation is input or not. If a user wishes to select a predetermined function, for example, "SUB MENU 3" 520, the user scans the region in which the "SUB MENU 3" 520 is displayed using a pointing device 510, as shown in the top portion of FIG. 5A. This operation is the first pointing operation. In this case, the image processing apparatus 200 displays the second indicator (e.g., "YES" and "NO" indicators) to inquire whether to input the second pointing operation to confirm whether to execute the "SUB MENU 3" 520. For example, as shown in the middle portion of FIG. 5A, the image processing apparatus 200 displays a "YES" indicator 522 to select input of the second pointing operation and a "NO" indicator 521 to not select the input of the second pointing operation. Thereafter, as shown in the bottom portion of FIG. 5A, when the pointing device 510 scans the "YES" indicator 522, the image processing apparatus 200 determines that the second pointing operation is input, and then performs the selected predetermined function, that is, the "SUB MENU 3" 520.

As shown in FIG. 5B, if the trace of the pointing device 510 is moved in the direction indicated by the second indicator, it is determined whether the second pointing operation is input or not depending on contents of the second indicator. That is, the direction in which the pointing device is moved is detected to receive and determine a user's intention.

If a user wishes to select a predetermined function, for example, the "SUB MENU 3" 520, the user scans the region in which the "SUB MENU 3" 520 is displayed, using the pointing device 510, as shown in the top portion of FIG. 5B. This operation is the first pointing operation. In this case, as shown in the middle portion of FIG. 5B, the image processing apparatus 200 displays a "YES" indicator 532 to select input of the second pointing operation and a "NO" indicator 531 to not select the input of the second pointing operation. The "YES" indicator 532 and the "NO" indicator 531 indicate respective particular directions. For example, referring to FIG. 5B, the "YES" indicator 532 indicates a right direction and the "NO" indicator 531 indicates a left direction. Thereafter, as shown in the bottom portion of FIG. 5B, when the pointing device 510 scans the "YES" indicator 532 in the right direction so that the trace of the pointing device 510 can be moved in the direction indicated by the "YES" indicator 532, the image processing apparatus 200 determines that the second pointing operation is input, and then performs the selected predetermined function, that is, the "SUB MENU 3" 520.

FIG. 5C shows main menus which are selected by the first pointing operation and the second pointing operation.

The image processing apparatus 200 may display a selected predetermined function and arrange the second indicator centering around the predetermined function. In this case, it is determined whether to execute a corresponding function depending on contents of the second indicator selected by a user.

If the user wished to select a main menu 2 540 and displays a sub menu of the menu 2 540, the user scans the region in which the main menu 2 540 is displayed, using the pointing device 510. This operation is the first pointing operation. In this case, the image processing apparatus 200 displays a "YES" indicator 544 to select input of the second pointing operation and a "NO" indicator 542 to not select the input of the second pointing operation. Thereafter, when the pointing device scans the "YES" indicator 544 in the direction indicated by the "YES" indicator 544, the image processing apparatus 200 executes the main menu 2 540. FIG. 5C may also include sub menus similar to those shown in FIGS. 5A and 5B.

In this exemplary embodiment, a function selected by a user is displayed and a secondary response indicator may be displayed in the left and right sides centering around the selected function. That is, when the user selects a particular function, the particular function is displayed with an image and characters and the secondary response indicator is displayed on the left and right sides centering around the particular function. The secondary response indicator is to confirm whether or not the function selected by the user is a function intended by the user.

The secondary response indicator may be arranged in different manners instead of being arranged in the left and right directions. In addition, the method of selecting a particular function and inquiring whether to execute the selected function may be also set in various manners.

According to this exemplary embodiment, it is possible to prevent a malfunction due to misrecognition by informing a user that a corresponding function is selected and allowing the user to confirm whether to execute the selected function before the particular function is selected and executed.

Figure 6:
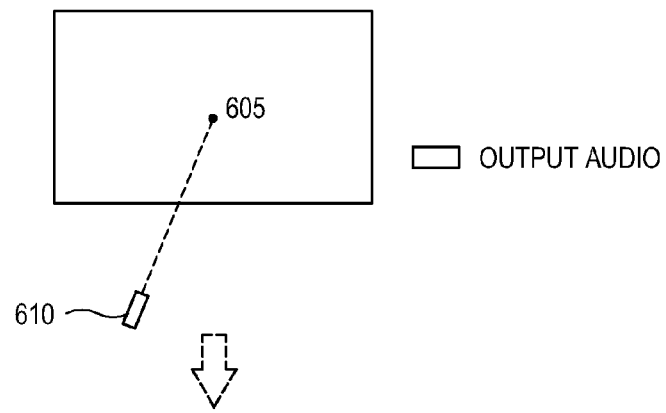
FIG. 6 is a view showing a method of controlling an image processing apparatus according to still another exemplary embodiment.
Figure 6:
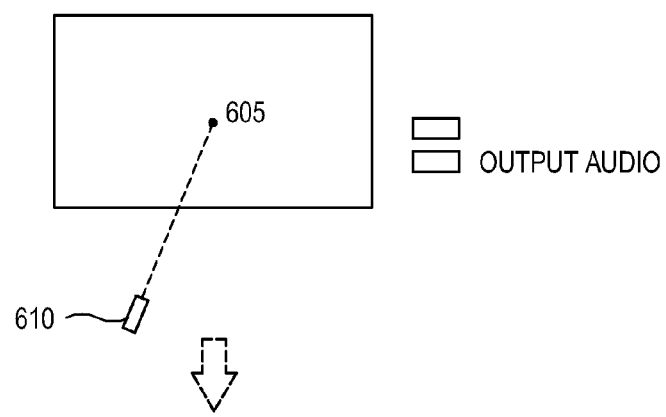
Figure 6:
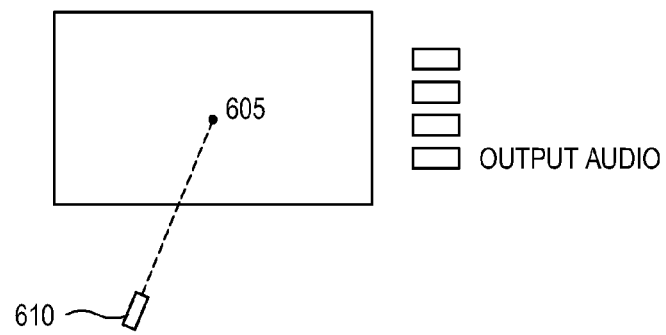

FIG. 6 is a view showing a method of controlling an image processing apparatus according to still another exemplary embodiment.

According to the method of controlling the image processing apparatus 200 according to this exemplary embodiment, if the second pointing operation is a particular operation which occurs for a predetermined period of time, the image processing apparatus 200 may output a sound indicating whether or not the predetermined period of time elapses. In this case, the image processing apparatus 200 may change at least one of output volume, output interval, and output type of the sound over time.

The indicating sound may be output in different manners. The sound begins to be output from the point of time when the second pointing operation to confirm whether to execute a selected predetermined function is input. The sound to indicate a standby state may be varied over time.

For example, as shown in FIG. 6, if the second pointing operation corresponds to an operation to indicate a point for more than 3 seconds, a user continues to scan the point 605 with a pointing device 610 for a period of time (e.g., 3 seconds). In this case, the volume of the indicating sound to be output is increase over time. This enables the user to easily determine whether the image processing apparatus 200 is in a state where the selected predetermined function is executable.

Figure 7:
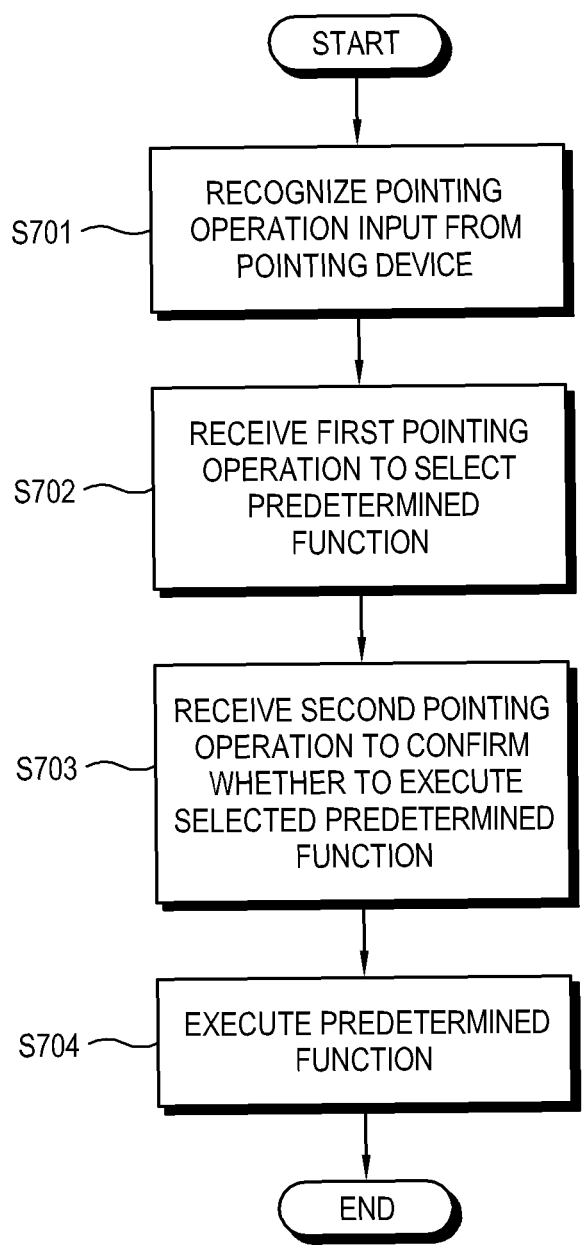
FIG. 7 is a view showing a control process of an image processing apparatus according to an exemplary embodiment.

FIG. 7 is a view showing a control process of an image processing apparatus according to an exemplary embodiment.

The image processing apparatus 200 recognizes a pointing operation input from a pointing device (S701).

Next, the image processing apparatus 200 receives the first pointing operation to select a predetermined function from the pointing device (S702). After receiving the first pointing operation, the image processing apparatus 200 holds a standby state to prepare for execution of the predetermined function until the second pointing operation is input.

Thereafter, the image processing apparatus 200 receives the second pointing operation to confirm whether to execute the selected predetermined function from the pointing device (S703).

Finally, the image processing apparatus 200 executes the predetermined function (S704).

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
   an image processing unit which processes and displays an image;
   a recognizing unit which recognizes a pointing operation input from a pointing device; and
   a control unit which executes a predetermined function when a first pointing operation which selects the predetermined function and a second pointing operation which confirms whether to execute the selected predetermined function are input from the pointing device, and controls the image processing unit to process the image in response to the execution of the predetermined function,
   wherein, when the first pointing operation is input, the control unit holds the predetermined function in a standby state to prepare for execution of the predetermined function until the second pointing operation is input.

2. The image processing apparatus according to claim 1, wherein the second pointing operation includes at least one of an operation which occurs for a predetermined period of time, an operation which is repeated a predetermined number of times, a pattern of operation, an operation which indicates any region on a screen, and an operation which indicates a specified region on a screen.

3. The image processing apparatus according to claim 2, wherein, if the operation which occurs for the predetermined period of time stops before the predetermined period of time elapses or if the operation which is repeated by the predetermined number of times stops before the predetermined number of times is reached, the control unit restarts a determination operation as to determine whether the predetermined period of time elapses or the predetermined number of times is reached from a point of time when one of the operations which occurs for the predetermined period of time or which is repeated by the predetermined number of times is again input.

4. The image processing apparatus according to claim 1, wherein the control unit controls the image processing unit to display a second indicator to inquire whether to input the second pointing operation.

5. The image processing apparatus according to claim 1, wherein the pointing device includes at least one of a laser pointer and a light pen.

6. The image processing apparatus according to claim 2, further comprising an audio processing unit which processes and outputs audio,
   wherein the control unit controls the audio processing unit to output a sound which indicates whether the predetermined period of time elapses.

7. The image processing apparatus according to claim 6, wherein the control unit controls the audio processing unit to change at least one of output volume, output interval, and output type of the sound over time.

8. An image processing apparatus comprising:
   an image processing unit which processes and displays an image;
   a recognizing unit which recognizes a pointing operation input from a pointing device; and
   a control unit which executes a predetermined function when a first pointing operation which selects the predetermined function and a second pointing operation which confirms whether to execute the selected predetermined function are input from the pointing device, and controls the image processing unit to process the image in response to the execution of the predetermined function,
   wherein the second pointing operation includes at least one of an operation which occurs for a predetermined period of time, an operation which is repeated a predetermined number of times, a pattern of operation, an operation which indicates any region on a screen, and an operation which indicates a specified region on a screen, and
   wherein the control unit controls the image processing unit to display a first indicator to indicate whether the predetermined period of time elapses.

9. The image processing apparatus according to claim 8, wherein the control unit controls the image processing unit to change at least one of definition, transparency, size, color and contents of the first indicator over time.

10. A method of controlling an image processing apparatus, comprising:
    recognizing a pointing operation input from a pointing device;
    receiving a first pointing operation which selects a predetermined function;
    receiving a second pointing operation which confirms whether to execute the selected predetermined function;
    executing the selected predetermined function and processing and displaying an image in response to the execution of the selected predetermined function;
    when the first pointing operation is input, holding the predetermined function in a standby state to prepare for execution of the predetermined function until the second pointing operation is input.

11. The method according to claim 10, wherein the second pointing operation includes at least one of an operation which occurs for a predetermined period of time, an operation which is repeated a predetermined number of times, a pattern of operation, an operation which indicates any region on a screen, and an operation which indicates a specified region on a screen.

12. The method according to claim 11, further comprising:
    if the operation which occurs for the predetermined period of time stops before the predetermined period of time elapses or if the operation which is repeated by the predetermined number of times stops before the predetermined number of times is reached, restarting a determination as to determine whether the predetermined period of time elapses or the predetermined number of times is reached from a point of time when one of the operations which occurs for the predetermined period of time or which is repeated by the predetermined number of times is again input.

13. The method according to claim 10, further comprising displaying a second indicator to inquire whether to input the second pointing operation.

14. The method according to claim 10, wherein the pointing device includes at least one of a laser pointer and a light pen.

15. The method according to claim 11, further comprising outputting a sound which indicates whether the predetermined period of time elapses.

16. The method according to claim 15, further comprising changing at least one of output volume, output interval, and output type of the sound over time.

17. A method of controlling an image processing apparatus, comprising:
- recognizing a pointing operation input from a pointing device;
- receiving a first pointing operation which selects a predetermined function;
- receiving a second pointing operation which confirms whether to execute the selected predetermined function;
- executing the selected predetermined function and processing and displaying an image in response to the execution of the selected predetermined function,
- wherein the second pointing operation includes at least one of an operation which occurs for a predetermined period of time, an operation which is repeated a predetermined number of times, a pattern of operation, an operation which indicates any region on a screen, and an operation which indicates a specified region on a screen; and
- displaying a first indicator to indicate whether the predetermined period of time elapses.

18. The method according to claim 17, further comprising changing at least one of definition, transparency, size, color and contents of the first indicator with time.

\* \* \* \* \*